(No Model.) 2 Sheets—Sheet 1.

F. O. MATTHIESSEN.
BONE BLACK DISCHARGER FOR CONTINUOUS FILTERS.

No. 335,603. Patented Feb. 9, 1886.

Witnesses:
R. C. Howes
M. L. Adams.

Inventor:
Franz O. Matthiessen,
Per Edw. E. Quimby,
Atty.

(No Model.)
2 Sheets—Sheet 2.

F. O. MATTHIESSEN.
BONE BLACK DISCHARGER FOR CONTINUOUS FILTERS.

No. 335,603.  Patented Feb. 9, 1886.

Witnesses:
R. C. Howes
M. L. Adams

Inventor:
Franz O. Matthiessen,
Per Edw. E. Luimby,
Atty.

UNITED STATES PATENT OFFICE.

FRANZ O. MATTHIESSEN, OF IRVINGTON, NEW YORK.

BONE-BLACK DISCHARGER FOR CONTINUOUS FILTERS.

SPECIFICATION forming part of Letters Patent No. 335,603, dated February 9, 1886.

Application filed October 2, 1885. Serial No. 178,789. (No model.)

*To all whom it may concern:*

Be it known that I, FRANZ O. MATTHIESSEN, of Irvington, New York, have invented a certain Improvement in Bone-Black Dischargers for Continuous Filters, of which the following is a specification.

In continuous filters for purifying sugar-liquor by the process of upward filtration through bone-black a discharger is employed for the gradual removal from the bottom of the filtering-chamber of bone-black which at that point becomes gradually charged with impurities and loses its decolorizing power, the supply of fresh bone-black being kept up by feeding it into the upper part of the filtering-chamber.

The present improvement consists of a bone-black discharger in the form of a grate, which is adapted to be reciprocated in a horizontal path at the bottom of the filtering-chamber, and which is provided with grate-bars having the capacity of rotation upon their longitudinal axes.

Figure 1:
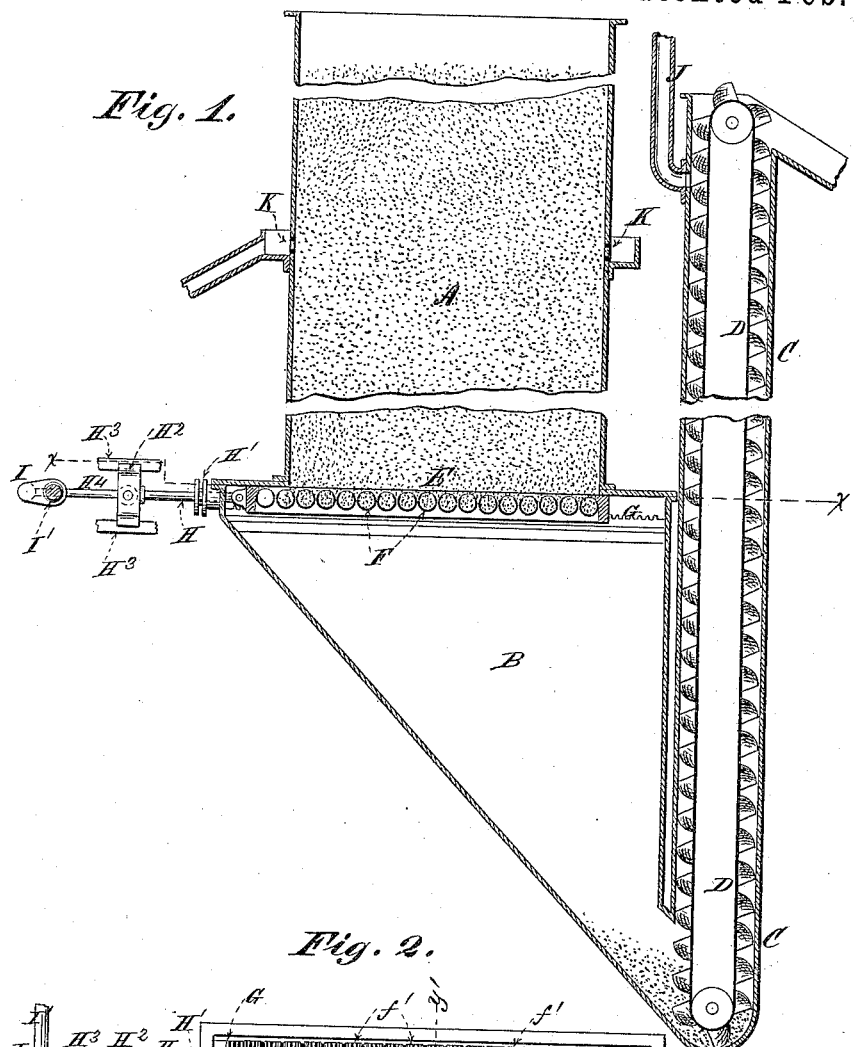
Figure 2:
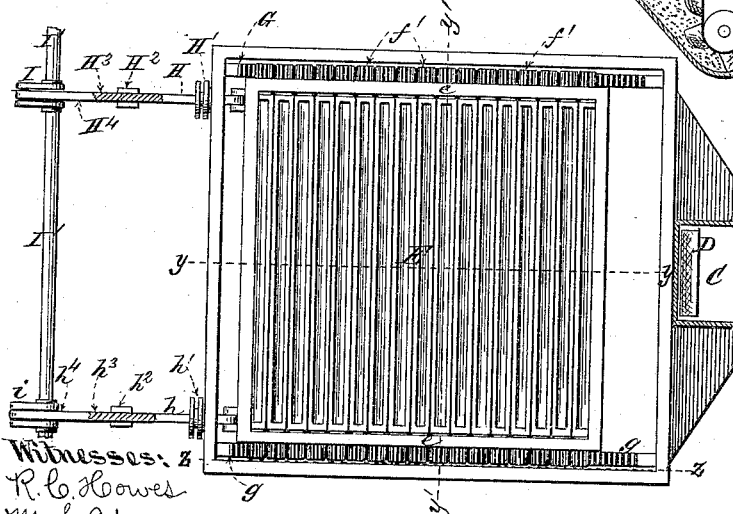
Figure 3:
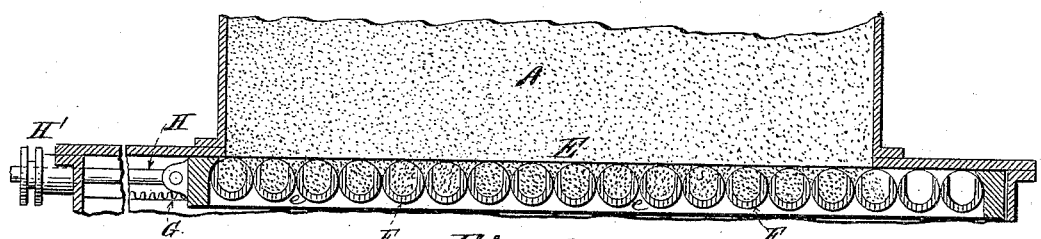
Figure 4:
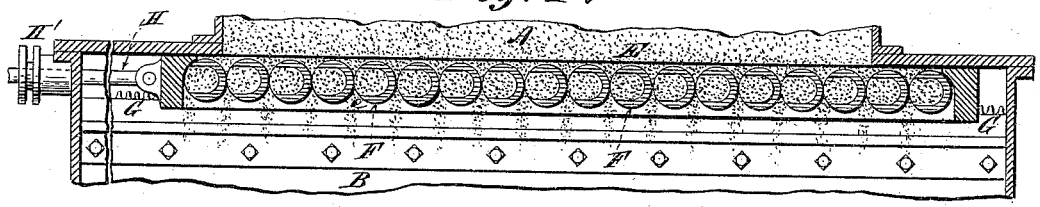
Figure 5:
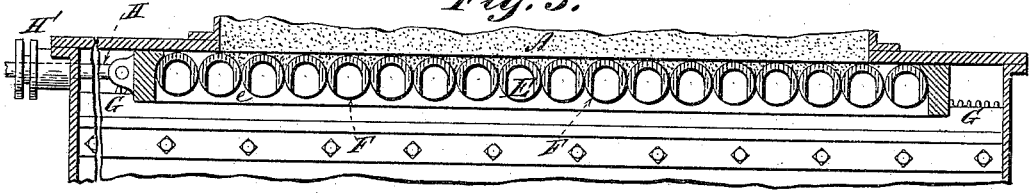
Figure 6:
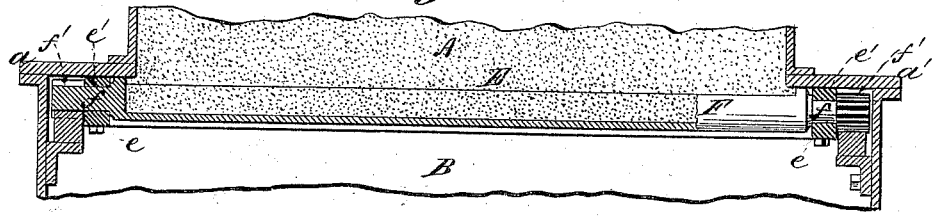
Figure 7:
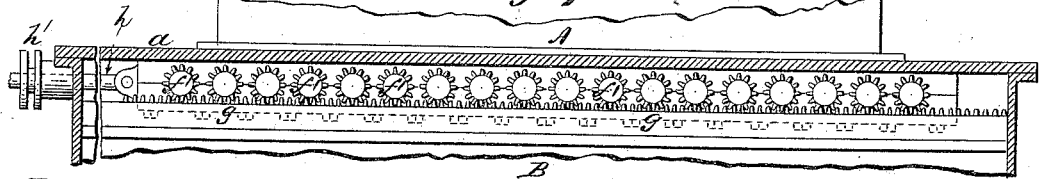

The accompanying drawings, illustrating the application of the invention to apparatus for purifying sugar-liquor by the process of upward filtration through bone-black, are as follows:

Figure 1 is a central vertical section of the filtering apparatus, showing the filtering-chamber surmounting a receiving-chamber, which communicates with the bottom of a well containing an elevator for removing the exhausted bone-black delivered from the receiving-chamber. Fig. 2 is a horizontal section through the line $x\,x$ on Fig. 1, affording a top view of the grate or bone-black discharger. Fig. 3 is a vertical section of the grate, taken through the line $y\,y$ on Fig. 2, showing the positions of the grooved grate-bars at the end of the forward excursion of the grate. Fig. 4 is a vertical section on the same plane as Fig. 3, showing the positions assumed by the grooved grate-bars when the grate has completed one-quarter of its backward excursion. Fig. 5 is a vertical section on the same plane as Figs. 3 and 4, showing the positions assumed by the grooved grate-bars when the grate has completed one-half of its excursion in either direction. Fig. 6 is a vertical section through the line $y'\,y'$ on Fig. 2, showing one of the grate-bars partly in elevation and partly in central longitudinal section. Fig. 7 is a vertical section through the line $z\,z$ on Fig. 2, showing in elevation one of the stationary racks and one of the series of toothed wheels affixed, respectively, to the trunnions of the grate-bars.

The apparatus represented in the drawings consists of the usual filtering-chamber, A, surmounting a receiving-chamber, B, which communicates with the bottom of a well, C, provided with a chain-and-bucket elevator, D. The bottom of the filtering-chamber is a horizontal grate, E, which has a quadrangular-frame, and is of greater horizontal area than the horizontal area of the filtering-chamber. The grate-bars F are preferably in the form of troughs, the sides and bottoms of which are concentric with their longitudinal axes. Each bar is provided at its opposite ends with the horizontal trunnions $f\,f$, which are provided with bearings $e'\,e'$ in the opposite side members, $e\,e$, of the grate-frame. Each of the trunnions $f$ projects entirely through its bearing, and upon its outer end has affixed to it the toothed wheel $f'$. There are thus two series of toothed wheels upon opposite sides of the grate-frame. The two series of toothed wheels are supported upon and engaged by the horizontal racks G $g$, respectively. The racks G $g$ are firmly secured to and supported by the upper portion of the side walls of the receiving-chamber B. The tops of the side members, $e\,e$, of the grate-frame are respectively immediately under the lateral extensions $a$ and $a'$ of the shell of the filtering-chamber, which extensions constitute portions of the top of the receiving-chamber. The side members, $e\,e$, of the grate-frame have affixed to them the inner ends of the horizontal rods H $h$, respectively. These rods are adapted to slide in suitably-packed bearings, H' and $h'$, formed in the end wall of receiving-chamber. The outer ends of the rods H $h$ are provided with the cross-heads $H^2\,h^2$, respectively, which slide in suitable horizontal guides, $H^3\,h^3$, and are linked by means of the pitmen $H^4\,h^4$, respectively, to the cranks I $i$ of the operating-shaft I'. When the operating-shaft is rotated, which is effected by power applied to the shaft in any convenient way, the grate E, at each complete revolution of the operating-shaft, is moved first forward and then backward in a horizontal path. As the grate F is supported upon wheels $f'\, f'$, &c., which roll upon the stationary racks G $g$, respectively, the effect of the forward motion of the grate is to cause the rotation of the grate-bars in one direction, and the effect of the backward movement of the grate is to cause the rotation of the grate-bars in the opposite direction. The range of movement of the grate is fixed with reference to imparting to the grate-bars a complete revolution in one direction during the forward movement of the grate, and a complete revolution in the opposite direction during the backward movement of the grate. The side members, $e\, e$, of the grate-frame, which serve the purpose of transmitting motion to the rolling grate-bars in addition thereto preserve the grate-bars in their proper equidistant parallel positions. When the grate-bars occupy the positions in which they are represented in Fig. 1, the spaces between them are not wide enough to permit the superincumbent bone-black to fall between them into the receiving-chamber; but when the grate-bars are so far rotated that the mouths of the troughs formed in them occupy a vertical plane, as shown in Fig. 4, or a plane nearly vertical, the spaces between the bars are widened sufficiently to permit the bone-black to fall between them. If, therefore, the grate is moved slowly, a larger quantity of bone-black will fall through the spaces between the grate-bars during each excursion of the grate; and, on the contrary, if the grate is moved rapidly, less time will be afforded for the fall of the bone-black between the bars, and a less quantity will fall. It will be seen that at the end of each excursion of the grate, the grate-bars are brought to rest with the mouths of the troughs uppermost in position to enable the troughs to become filled with bone-black. During each excursion of the grate the troughs are turned with their mouths downward, and discharge their contents into the receiving-chamber, and are thus prepared to be refilled when they are rotated sufficiently far to permit the superincumbent bone-black to fall again into them.

It will of course be understood that the grate-bars instead of being grooved may be made solid, having portions of their surfaces flattened in order to provide for an enlargement of the spaces between the bars during the excursions of the grate.

In apparatus of the class to which this improvement is applied the sugar-liquor to be decolorized is continuously supplied through the service-pipe J under suitable pressure to enable it to force its way upward through the column of bone-black contained in the filtering-chamber to the level of the outlets K therefrom through which it is discharged, and it is intended that during its passage through the filtering-chamber it shall be acted upon by a sufficient quantity of bone-black to decolorize it to the extent required. It is also intended that the decolorizing power of the quantity of bone-black through which the sugar-liquor is forced shall remain substantially unchanged by the gradual removal of the exhausted bone-black and collected impurities from the bottom of the filtering-chamber, and the concurrent feeding of fresh bone-black into the top of the filtering-chamber. It will therefore be seen that the rapidity or frequency with which the discharging-grate is operated will be governed by the proportion of impurities present in the sugar-liquor which is being filtered, and the quantity of exhausted bone-black hence requiring to be discharged from the bottom of the filtering-chamber.

I claim as my invention—

1. In apparatus for purifying sugar-liquor by the process of upward filtration through bone-black, the combination, as herein set forth, of a filtering-chamber surmounting a receiving-chamber, a bone-black discharger consisting of a grate provided with grate-bars having the capacity of rotation upon their longitudinal axes, means for reciprocating the said grate in a horizontal path and for rotating the said grate-bars for the purpose of effecting when required the discharge into the said receiving-chamber of the exhausted bone-black from the bottom of the column of bone-black supported upon the said grate, and means for removing the said exhausted bone-black from the said receiving-chamber.

2. The series of horizontal grate-bars F, having upon their opposite ends trunnions $f$ $f$, which are provided with bearings in the side members, $e\, e$, of the grate-frame, each of which trunnions has affixed to it the toothed wheel $f'$, in combination with the horizontal racks G $g$, and means for imparting reciprocating movement to the grate-frame, and thereby causing the rotation of the grate-bars, as and for the purpose set forth.

3. In combination with a filtering-chamber for containing a column of bone-black, a device for supporting the said column and for effecting when required the gradual removal of bone-black from the bottom thereof, consisting of a reciprocating grate provided with a series of horizontal grate-bars in the form of troughs having the capacity of rotation upon their longitudinal axes, and means for causing the said grate-bars to turn upon their longitudinal axes during the movements of the reciprocating grate, as and for the purpose set forth.

F. O. MATTHIESSEN.

Witnesses:
J. FERGUSON,
FRED WILCOX.